May 24, 1932.   I. Q. GURNEE   1,860,026
COLLECTOR RING FOR MAGNETOES
Filed Aug. 21, 1929
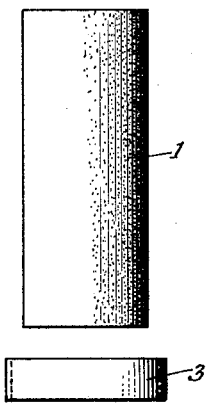
Fig.1.
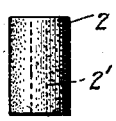
Fig.2.
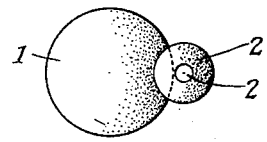
Fig.3.
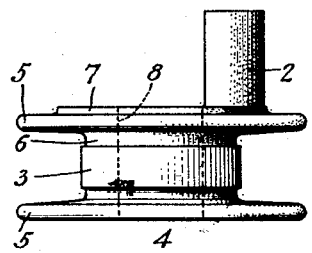
Fig.4.
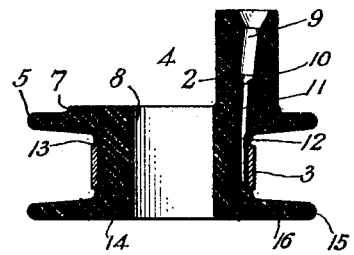
Fig.5.
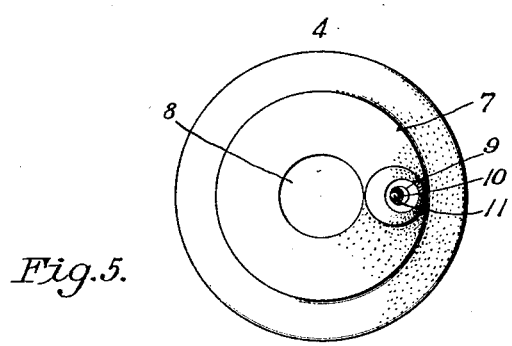
Inventor
ISAAC Q. GURNEE
By Parker Cook
Attorney Patented May 24, 1932

1,860,026

UNITED STATES PATENT OFFICE

ISAAC Q. GURNEE, OF BUTLER, NEW JERSEY

COLLECTOR RING FOR MAGNETOES

Application filed August 21, 1929. Serial No. 387,396.

My invention relates to new and useful improvements in collector rings for magnetoes and has for an object to provide a ring that can be easily formed and, when finished, will not burn or permit the high tension current to leak therethrough or, in other words, short-circuit.

One of the objects of the invention is to provide a collector ring that is molded into shape and formed of rubber, that is part crude and part reclaimed rubber which is free from grit or metal, such as inner tubes or automobile tires. With this is mixed sulphur and asbestos, together with hard rubber dust and cotton seed oil in such percentages as to produce a very high form of dielectric and making it possible to constantly use a high voltage without in any way damaging the ring.

Still another object of the invention is to provide a magneto collector ring wherein one small block or blank of the material, later to be described, is used, together with a smaller piece of the same material and the two parts molded together. A metal ring is also placed in the mold during the formation of the ring, which latter ring carries the high tension current. Furthermore, it is possible with some rings where the pinion is located near the center to use but the one piece of material as sufficient pressure may be obtained to fill the cavity of the pinion well in the die, or in other words, make the pinion out of the one piece.

Still another object of the invention is to provide a magneto collector ring of such a composition that, as the composition is cured just after molding, it will not draw away from the insert or the included annular metal ring about the hub, as when this happens the space between the annular ring and the insert would shortly fill with dirt or dust which, in turn, allows the high tension current to short or leak and thus prevent the ring from functioning.

Still another object of the invention is to form a collector ring of an insulating composition which, in itself, is nearly a perfect dielectric and, at the same time, will not be so brittle that it will allow the ring to be easily broken but, on the other hand, will have the desired flexibility, combined with the insulating and heat resisting qualities.

Still another object of the invention is to provide a collector ring formed of a composition that is an excellent dielectric, will not burn, and, at the same time, will allow the pinion of the collector ring to be perfectly molded and merged with the body of the ring.

With these and numerous other objects in view, the invention consists in certain new and novel arrangements and composition of parts which will be hereinafter more fully described and pointed out in the claims.

Referring now to the drawings showing a prefered type of collector ring,

Fig. 1 is a view showing the blank of material for the ring, a blank that forms the pinion, and the metal ring;

Fig. 2 is a top plan showing the two blanks in their position before being molded;

Fig. 3 is a side elevation of the collector ring;

Fig. 4 is a sectional view of the same; and

Fig. 5 is a top plan view of the collector ring.

At the outset, a short description of the collector ring will be set forth, after which the gist of the invention, that is, the materials from which it is made, will be described.

In Fig. 1, there is shown the blank of the composition out of which the ring is molded, designated by the numeral 1, and there will be seen a second smaller blank of the same material 2, which has the central bore 2'. A metal ring 3, which may be Monel metal or any other alloy having a high co-efficient of conductivity, may be used. The ring 3 is then put in a mold and the blank 1 slipped through and likewise the blank 2 and then pressed and molded into the collector ring 4, as shown in Fig. 3.

It will be noticed that the collector ring 4 comprises the two flanges 5 and the hub 6, while a small spacing flange 7 is shown on the top surface thereof. Through this collector ring 4 is the bore 8, while in the pinion 2 the former bore 2' is now shaped, as at 9, and then proceeds angularly, as at 10. In this continuation of the bore, there is the small metal tube 11, which is deformed, as at 12, and is in contact with the metal ring 3, which is partially embedded in the hub, as at 13.

It will be understood that the high tension current is connected with this tube, so as to conduct the current to the annular ring 3.

Although I have shown the collector ring made of two blanks, it will be understood that in many instances the complete ring may be made from the one blank of material, as the compound when warm will flow into that part of the mold that forms the pinion, as the pinion is near enough to the center of the ring to accomplish this result.

In other rings, where the pinion is out near the periphery, it may be necessary to use the two blanks.

It might be mentioned that about twenty-two thousand volts are used in these collector rings and although the amperage is only about one four-thousandths of an ampere, still if there is any leakage or shorting in an ordinary collector ring, it will burn the rubber of the collector ring and prevent the ring from properly functioning. With the present ring made of the composition about to be described, each ring is carefully tested with forty thousand volts.

I have found, after making many thousands of rings, that if the rings are made from blank or blanks which are, in turn, made of the following ingredients, there will be no leakage, shortage or burning of the ring, nor are they so brittle that they will crack or break in use.

To 24.5% rubber, I add 13.2% of sulphur and 36.2% of hard rubber dust, (which hard rubber dust may be composed of approximately 75% of rubber and 25% of sulphur). To this is added asbestos, that is, 24.1% and to this whole mixture is added 2% of cottonseed oil, or linseed oil may be used, if desired.

It might be mentioned here that this 24.5% rubber may be partly reclaimed rubber and part crude rubber. Of course, the reclaimed rubber must be clean and free from grit and I have found that the inner tubes of automobile tires has proved very satisfactory. By using this reclaimed rubber, we can reduce our cost, as of course, it is cheaper than the genuine rubber.

Stating the ingredients now in pounds, rather than in percentages, I have found that the following makes up an efficient batch: 5 lbs. reclaim to 7 lbs. rubber (crude), 6½ lbs. sulphur, 18 lbs. rubber dust, 1 lb. oil, 12 lbs. asbestos pulp.

In making up the batch, the asbestos, preferably in the form of pulp, is mixed with the rubber in plastic condition, along with the hard rubber dust, the oil and the sulphur, and the batch then passed between the grinding rolls, so that the asbestos is evenly distributed throughout and all of the parts uniformly distributed.

I might say that the material is semi-cured from three to fifteen minutes to set, and is then completely cured in thirty minutes to seven hours.

Of course, the length of time in the vulcanizer in curing depends on the amount of accelerator used in the compound, which regulates the hardening power of the mixture. I prefer to use the steam rather than the dry heat.

After the batch is thus thoroughly ground and pressed in sheets, it is then made into rods or blanks, which may then be cut off to the proper length for molding and vulcanizing into the spools or collector rings.

Now the most important point in making the composition is to have the proper amount of asbestos, as if there is too large a quantity of asbestos, say 50%, the small pinion 2 will not properly unite with the flange 5 of the ring when molded together. In other words, the particles of asbestos do not adhere and there must be enough rubber to act as a flux to bind the asbestos particles and thus unite the pinion with the spool. I have found that by using the 24.1% of asbestos, the rubber will more thoroughly mix with the asbestos particles and the rubber in the ring flange will unite with the rubber in the pinion and form a perfect molded union.

Furthermore, if too much asbestos is used, the ring even if made in one piece will not have the desired flexibility, but will be brittle and apt to break in service.

In Fig. 4, I have designated the rubber by the numeral 14, the asbestos by the numeral 15 and the hard rubber dust by the numeral 16, to try and illustrate the important ingredients of the composition, but it will be understood that the entire ring is made up of this thoroughly ground and thoroughly mixed composition, so that in reality, only minute specks of the asbestos may be seen when closely examining the hard rubber of the collector ring.

Heretofore, most hard rubber collector rings have been made of the Goodyear or Kiel compounds, but I have found that when either of these compounds harden, there are shrinkage spots and the compound tends to pull the insert 11 away from the metal ring 3. When this happens, the cavities or recesses become clogged with dirt and causes the brush (not shown) to spark and interfere with the function of the ring. With a collector ring made of the composition as above outlined, there is no shrinkage or separating of the parts, nor will the hub 6 pull away from the ring 3.

By using 24.1% of asbestos with the rubber, the asbestos also acts as a fire-resisting element and, at the same time, removes the flexibility of the rubber and produces a hard fire-resisting, dead compound. Furthermore, by using a proper amount of asbestos, the rubber acts as a flux and allows, while under heat and pressure, for the complete co-mingling of the minute particles of asbestos in the rubber.

It is well known that the weakest point of a collector ring from an electrical standpoint is in the joint or joints, and in the present ring, there is only one joint, that is, where the pinion 2, when in a soft state, is molded into the flange 5 of the collector ring.

However, by using the percentage of asbestos outlined, I have overcome any tendency for the ring to leak at this point and the union is of such strength, mechanically, that the pinion in ordinary service will not break or snap from the ring.

It will be understood that although the formula that I have set out is the one that is most preferred, a slight variation might be made and still produce the desired result. As before mentioned, I use rubber, crude or reclaimed, to the extent of 24.5%, but a slight variance, such as 10% of this amount, plus or minus, might be allowed which would in other words add or subtract 2.5% of rubber. In the same way, the sulphur contents might vary 10% of the amount or, in other words, about 1% more or less of sulphur, while the hard rubber dust might vary 25% of the 36%.

Now in the asbestos, I have found that 24.1% is by far the most preferable, but 36% of this 24% might be added or subtracted or, in other words, 6% more or less asbestos might be used with safety.

Lastly, it might be mentioned that I do not wish to be restricted to as high an amount of asbestos as above mentioned, as even a smaller quantity will form a good ring if the compound is formed as above mentioned. In other words, I could make the ring with safety with less asbestos than the amount shown but not with more asbestos.

From the foregoing, it will be seen that I have formed a collector ring having but two pieces and one joint (plus the metal ring) and by molding this collector ring out of crude or reclaimed rubber, sulphur and a definite quantity of asbestos, I have produced a ring having great dielectric properties, is flexible, (not too brittle) has great heat-resisting properties and will allow the two parts to be perfectly molded together.

Furthermore, in some cases where the pinion is close to the hub, it may be possible to mold the ring out of but one piece.

Furthermore, by mixing the asbestos with the rubber in the proportions mentioned, the ring is a good insulator, will not burn or melt, either from voltage or friction and, as before mentioned, will under test not leak or break down under forty thousand volts on a 60 cycle A. C. current or forty thousand volts, thirty-six hundred pulsations per minute with a direct current.

It might be mentioned that there is at times a small amount of lime found in its free state in asbestos, but this is of no matter and sometimes magnetic metal may be found in its free state in asbestos and if the latter is present, it should be withdrawn magnetically.

I am aware that it is old to mix asbestos with rubber to form insulation, but unless the percentage of asbestos and the other ingredients, as set out, are used in the making of a collector ring, the same will be useless, which I have found after making many thousands of rings and determining the above correct proportions.

Having thus described my invention, what I claim as new and desire to secure by Letters Patent is:

1. A moldable hard rubber compound for forming magneto rings consisting of a molded and hardened composition of substantially 24.5% of rubber, crude or reclaimed, 13.2% of sulphur, 36.2% of hard rubber dust, 24.1% of asbestos and 2% of cottonseed oil.

2. A vulcanizable compound for forming collector rings consisting of 22.5% to 26.5% of rubber, 11.2% to 15.2% of sulphur, 22.2% to 50.2% of hard rubber dust, 18.1% to 30.1% of asbestos, and 2% of vegetable oil.

In testimony whereof I affix my signature.

ISAAC Q. GURNEE.